(12) United States Patent
Leem

(10) Patent No.: US 6,404,418 B1
(45) Date of Patent: *Jun. 11, 2002

(54) METHOD FOR DISPLAYING SELECTABLE KEYS IN AN OPTICAL DISC REPRODUCING SYSTEM AND AN APPARATUS THEREOF

(75) Inventor: Geon-Hoa Leem, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,850

(22) Filed: Dec. 24, 1997

(30) Foreign Application Priority Data

Sep. 24, 1997 (KR) .......................................... 97/48545

(51) Int. Cl.[7] .................................................. G09G 5/00
(52) U.S. Cl. ...................................... 345/168; 345/172
(58) Field of Search .................................. 345/168, 172

(56) References Cited

U.S. PATENT DOCUMENTS

| 4,378,217 | A | * | 3/1983 | Wilson et al. ............... 434/228 |
|---|---|---|---|---|
| 5,287,448 | A | * | 2/1994 | Nicol et al. .................. 395/159 |
| 5,621,905 | A | * | 4/1997 | Jewson et al. ............... 395/353 |
| 5,724,106 | A | * | 3/1998 | Autry et al. ................. 348/734 |
| 5,749,908 | A | * | 5/1998 | Snell ............................ 607/30 |
| 5,767,835 | A | * | 6/1998 | Obbink et al. ............... 345/146 |
| 5,909,551 | A | * | 6/1999 | Tahara et al. ........... 395/200.61 |
| 5,914,706 | A | * | 6/1999 | Kono .......................... 345/173 |
| 5,914,707 | A | * | 6/1999 | Kono .......................... 345/173 |

* cited by examiner

Primary Examiner—Steven Saras
Assistant Examiner—Srilakshmi Kumar
(74) Attorney, Agent, or Firm—Birch, Stewart, Kolasch & Birch, LLP

(57) ABSTRACT

A method and apparatus that uses offset information stored with respect to selectable keys to identify the selectable keys that are enabled during respective states of a playback operation. Once identified, the enabled selectable keys may be distinguished from non-enabled selectable keys visually, or otherwise. The enabled selectable keys may be identified and/or distinguished in at least three circumstances: (1) when a predetermined portion of a playback operation has been reached, (2) when a user input representing a non-enabled selectable key is received, and (3) when a user input representing an information acquisition key for requesting identification of enabled selectable keys is received.

16 Claims, 13 Drawing Sheets

| READ-IN AREA | INFORMATION AREA A (TRACK 1) | TRACK 1 | TRACK 2 | ..... | TRACK N | READ-OUT AREA |

31  32  33  34

| NAME OF FIELD | SIZE (BYTES) | VALUE |
|---|---|---|
| LIST HEADER | 1 | 0x10 |
| NUMBER OF ITEM (NOI) | 1 | |
| LIST ID | 2 | |
| PREVIOUS LIST OFFSET | 2 | |
| NEXT LIST OFFSET | 2 | |
| RETURN LIST OFFSET | 2 | |
| PLAYING TIME | 2 | |
| PLAY ITEM WAIT TIME | 1 | |
| AUTO PAUSE WAIT TIME | 1 | |
| PLAY ITEM #1 OFFSET | 2 | |
| : | : | |
| PLAY ITEM #NOI OFFSET | 2 | |

| SELECTABLE KEY | ENABLE FLAG | OFFSET ADDRESS |
|---|---|---|
| FF | 1 | F100 |
| REW | 1 | F200 |
| NEXT | 0 | |
| PREV | 0 | |
| RETURN | 0 | |
| PAUSE | 1 | F300 |
| PLAY | 1 | F400 |

FIG. 3B
PRIOR ART

METHOD FOR DISPLAYING SELECTABLE KEYS IN AN OPTICAL DISC REPRODUCING SYSTEM AND AN APPARATUS THEREOF

BACKGROUND OF THE INVENTION

1. Field of the Invention

The present invention relates to a method and apparatus for allowing a user to visually recognize selectable keys in a disc reproducing apparatus capable of performing interactive playback control, and more particularly to a method and apparatus for generating a display based on the existence of offset values corresponding to keys of a key input unit during playback control in a disc reproducing apparatus capable of performing interactive playback control.

2. Description of the Related Art

In a conventional optical disc reproducing apparatus, key input units are grouped by function blocks. For example, when a user listens to a piece of music on a compact disc (CD), all keys relating to the CD (e.g., music selecting keys such as >> and <<, a play key and a key for program memory if necessary) are illuminated to allow the user to visibly recognize selectable keys in the current state.

When a user inadvertently presses a key not included among the selectable keys, the user is informed of a selection error. For instance, a "red hand indication" is displayed for a certain time period to indicate a selection error resulting from selection of the disabled key.

If a component system includes a VCD or DVD system capable of performing interactive playback, the VCD- or DVD-related keys are illuminated in accordance with the functional shift to the VCD or DVD. The component system controls the illumination of the selectable keys based on the group of keys including the pressed key, without referencing information such as offset information of respective keys recorded on a disc. General VCD or DVD systems can also perform interactive playback control based on selectable keys that correspond to respective states.

As described above, a "red hand indication" is provided for a certain time period as a selection error message when the user inadvertently presses a key not included among the selectable keys. This type of error message enables the user to recognize that the selected key is disabled under the current condition. However, the user may not be apprised of the specific key giving rise to the problem until after they have tried the key several times via trial and error. Furthermore, the error message provide no guidance as to keys which represent available functions and operations during playback control. This may lead to user frustration. For instance, depending on the current operating state, the key selected by the user may change between an enabled or disabled state, leading a user to misinterpret the error message as an operational fault of the product.

The number of keys on the front of most electronic devices like disc drives has recently been reduced, those function keys and option keys being replaced by keys that are located on a remote controller. Yet, like the keys located on the front of a disc drive, keys on the remote controller have not been visually distinguished to identify enabled selectable keys for given states.

SUMMARY OF THE INVENTION

An object of the present invention is to provide a disc reproducing apparatus capable of performing interactive playback control, wherein enabled selectable keys of a key input unit are discriminated from non-enabled selectable keys, leading a user to visually recognize enabled selectable keys under respective states during predetermined portions of the play operation.

Another object of the present invention is to provide a disc reproducing apparatus capable of performing interactive playback control, where enabled selectable keys of a key input unit are discriminated from non-enabled selectable keys, leading a user to recognize the enabled selectable keys for playback control under respective states based on an interrupt received from the user during playback or during menu display.

Still another object of the present invention is to discriminate among enabled and disabled selectable keys of a key input unit on a player front, leading a user to recognize the enabled selectable keys under respective states during predetermined portions of the play operation.

Yet another object of the present invention is to discriminate among enabled and disabled selectable keys of a key input unit on a player front, leading a user to recognize the enabled selectable keys under respective states based on the input of an interrupt.

Another object of the present invention is to discriminate among enabled and disabled selectable keys of a key input unit on a screen, leading a user to recognize the enabled selectable keys under respective states during predetermined portions of the play operation.

Still, another object of the present invention is to discriminate among enabled and disabled selectable respective keys of a key input unit on a screen, leading a user to recognize the enabled selectable keys under respective states based on the input of an interrupt.

Yet another object of the present invention is to discriminate among enabled and disabled selectable keys of a key input unit on a remote controller, leading a user to recognize the enabled selectable keys under respective states during predetermined portions of the play operation.

Still another object of the present invention is to discriminate among enabled and disabled selectable keys of a key input unit on a remote controller, leading a user to recognize enabled selectable keys under respective states based on the input of an interrupt.

To accomplish these and other objects, the present invention includes methods and apparatuses that use offset information stored with respect to selectable keys to identify the selectable keys that are enabled during respective states of a playback operation. Once identified, the enabled selectable keys may be distinguished from non-enabled selectable keys visually, or otherwise. The enabled selectable keys may be identified and/or distinguished in at least three scenarios: (1) when a predetermined portion of a playback operation has been reached, (2) when a user input representing a non-enabled selectable key is received, and (3) when a user input representing an information acquisition key for requesting identification of enabled selectable keys is received.

More specifically, the method and apparatus of a first embodiment of the present invention reads offset information corresponding to selectable keys from a disc (e.g., DVD) and identifies at least one enabled selectable key based on whether offset information corresponding to each particular selectable key is stored on the disc.

The reading and identifying may be invoked during reproduction of a predetermined piece of information from the disc or in response to a user input. If invoked in response to a user input, the enabled selectable key(s) may be identified in at least two circumstances. First, the enabled selectable key(s) are identified based on whether the input corresponds to an enabled selectable key, the enabled selectable key(s) preferably being identified when the input does not correspond to an enabled selectable key. Second, the enabled selectable key(s) are identified when an information acquisition input for showing the enabled selectable key(s) is generated.

When the playback unit is controlled using a remote controller, a first control signal corresponding to a selectable key on the remote controller is received by the playback unit, a second control signal is transmitted to the remote controller from the playback unit when the first control signal corresponds to an information acquisition key for showing the enabled selectable key, and the remote controller or the display of the playback unit may identify the enabled selectable key(s) based on the second control signal. Processing of the second control signal may be delayed by fixed increments of time until the second control signal has been completely received.

The method and apparatus of a first embodiment of the present invention determines whether an interrupt corresponds to an enabled selectable key, and identifies the enabled selectable keys based on whether the interrupt corresponds to one or more of the enabled selectable keys. The interrupt, which corresponds to a selectable key for reproduction control, may be detected from the playback unit or a remote controller.

In each case, the enabled selectable key(s) may be visually identified on a front portion of the playback unit used to reproduce said offset data from said disc, on a remote controller used to control disc reproduction, or on some other display device. All or a limited portion of the enabled selectable key(s) may be visually identified using illumination of those keys or other display techniques such as on-screen displaying (OSD). For instance, a keyboard arrangement that visually discriminates between enabled selectable keys and non-enabled selectable keys may be displayed. Furthermore, the enabled selectable key(s) may be visually discriminated for a predetermined period of time. The offset information used to determine whether an enabled selectable key has been input may include offset address information or offset flag information.

BRIEF DESCRIPTION OF THE DRAWINGS

The above objects and other advantages of the present invention will become more apparent by describing in detail preferred embodiments thereof with reference to the attached drawings in which:

FIG. 2 shows a data format of a VCD disc;

FIGS. 3A and 3B show a play list of a DVD disc;

DETAILED DESCRIPTION OF THE PREFERRED EMBODIMENTS

Reference will now be made in detail to the preferred embodiments of the present invention, examples of which are illustrated in the accompanying drawings.

The aforementioned objects are preferably achieved in a disc reproducing apparatus capable of performing interactive playback control via a two step process. First, enabled selectable keys are identified in respective states during predetermined portions of the play operation or in response to a user's interrupt input. Second, enabled and disabled selectable keys of a key input unit are identified. More specifically, in the second step, keys in enabled states are visually distinguished from keys in a disabled state on the key input unit during the play operation in accordance with the result of the first step.

In connection with the first step, enabled selectable keys for each respective state may be determined based on the presence or absence of offset values with respect to the selectable keys during the play or menu selection for playback control.

In more detail, in an optical disc reproducing apparatus capable of performing interactive playback control, address offset values are generally provided for enabled selectable keys, which include those selectable key which are available for playback control under respective states. The address offset values indicate target for movement (jumps) relative to the current state in accordance with corresponding functions (e.g., previous screen, next screen, rewind or respective numeral keys) of respective keys. For example, if the "previous menu" key is an enabled selectable key in the current state, the "previous menu" key has the address offset value of a predetermined data area corresponding to the previous picture which precedes the current state. However, if data on the disc is recorded to inhibit a jump from the current picture to the previous picture, the "previous" menu key under the current state is disabled, having no address offset value. In other words, the selectable keys which are enabled for each playback state are determined based on the presence and absence of the offset values corresponding to the selectable keys of the key input unit under respective states, as described above.

Figures 2, 3A:
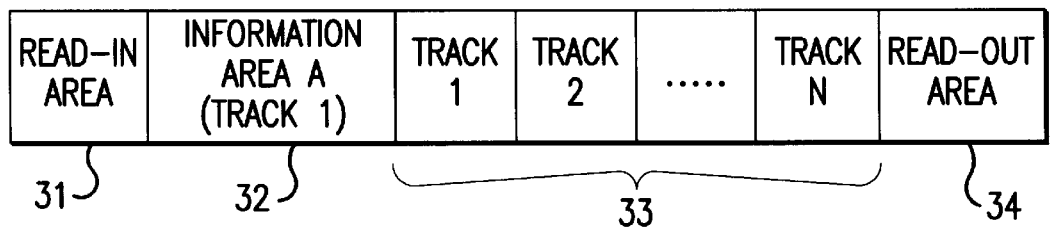

For instance, when the reproducing system is a VCD play system, as shown in FIG. 2, files such as info.vcd, entry.vcd, lot.vcd and psd.vcd are stored together in information area 32. The psd.vcd is stored with a selection list and play list. As shown in FIG. 3A, the play list is recorded with offset values representing offset information in respective states. Alternatively, the play list may be recorded with enable flags representing the offset information. That is, the offset information for respective keys under each state for the entire disc are recorded on predetermined information area 32. Based on this offset information, the currently-enabled selectable keys can be recognized under each respective state.

When the reproducing system is a DVD play system, data recorded within a single disc is too voluminous to record administrative information for managing the data at one specific area on the disc. Therefore, an administrative area is provided for each specific data unit. From this administrative area, address information with respect to selectable keys under respective states are read out, making it possible to decide the presence and absence of the offset information.

The data written in information area 32 (VCD) and the data written in the corresponding information area separately recorded on respective data areas (DVD) will each be referred to as "system control data or system control information" throughout this document. These terms therefore correspond to basic information data which controls the system.

The latter step involves visually discriminating among selectable keys of the key input unit based on whether they are determined to be enabled or disabled during the play operation in accordance with the results of the above-described first step. As described below, the second step may vary in accordance with whether the enabled selectable keys are identified at a predetermined portion of the playback operation or if they are instead identified in response to a user input, and also based on the type of key input unit used when the enabled selectable keys are identified in response to a user input.

If the key input unit includes a knob or button key attached to the front of a player, it is possible to visually discriminate among enabled and disabled keys of respective states based on the presence or absence of the address offset values with respect to selectable keys. For example, lights used to illuminate the knob key may be discriminatively displayed with respect to selectable keys based on whether those keys are deemed enabled based on the existence of corresponding offset information.

When an interrupt is supplied by a user during the play operation or menu display for interactive playback control, reproduction jumps to the address of the input key to be played if the interrupt input key is enabled. By contrast, if the interrupt input key is disabled, the information with respect to the enabled keys is displayed on a screen. By identifying the enabled selectable keys through illumination, the user is informed that a selection error has occurred, that the currently-selected key is inoperative, and that other selections are available. Similarly, enabled selectable keys may be displayed or otherwise identified when a predetermined portion of the playback operation is reached.

One way of to identify enabled selectable keys is to display only enabled selectable keys on an OSD (on screen display). An alternative method involves displaying all keys of the key input unit, where the enabled keys are visually distinguished from the disabled keys on that display through, for example, an overlap process.

If the key input unit includes a knob or button key attached to a remote controller, it is possible to distinguish between the enabled and disabled keys of respective states based on the presence or absence of address offset values with respect to the selective keys. For example, enabled knob keys of the remote controller can be visually discriminated when an interrupt is supplied by the user indicating a selection error during the play operation or menu display for interactive playback control. More specifically, once the user interrupt is supplied indicating a selection error, offset information data ("1" for enable and "0" for disable or "0" for enable and "1" for disable) is transmitted to the remote controller with respect to enabled or disabled keys of respective states in accordance with the presence or absence of the address offset values with respect to those selectable keys. Then, the remote controller receiving the offset information displays the selectable keys, visually discriminating among those which are enabled and those which are disabled.

A general optical disc reproducing system will now be described with reference to the accompanying drawings.

Figure 1:
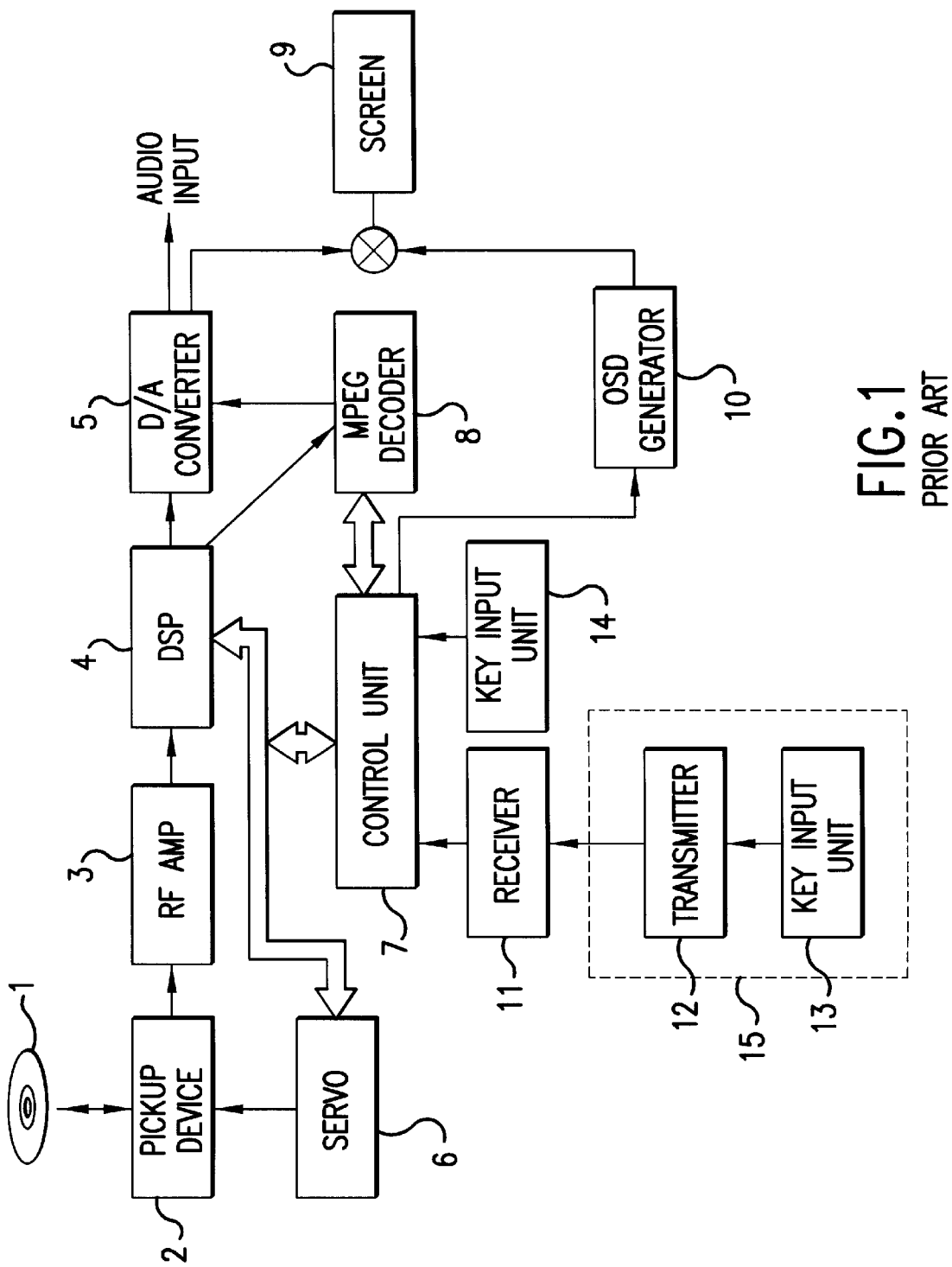
FIG. 1 is a block diagram showing an optical disc reproducing system.

FIG. 1 is a block diagram showing a general optical disc reproducing system.

The general optical disc reproducing system shown in FIG. 1 includes an optical disc, a player, a screen (or monitor), a remote controller and an audio system. The player is formed by a main body and a front arranged with keys for selecting the menu.

Typically, optical disc 1 stores compressed digital signals representing information such as motion pictures and sound data.

The player includes a pickup device 2, an RF amplifier 3, a digital signal processor (DSP) 4, a digital-to-analog (D/A) converter 5, a servo 6, a control unit 7, an MPEG decoder 8, an OSD generator 10, a screen 9, a key input unit 14 for selecting the menu and a receiver 11 for performing the radio communication with remote controller 15. Remote controller 15 includes a key input unit 13 and a transmitter 12 for transmitting key input signals of remote-controller key input unit 13 to player receiver 11.

Hereinbelow, the play operation of the above-described optical disc reproducing system will be described.

Optical disc 1 has at least one recording plane which records digital data in the form of pits. Pickup device 2 reads out the data from optical disc 1 and converts the optical signal generated based on the digital data into an electric signal. The electric signal output by pickup device 2 is amplified by RF amplifier 3. The amplified signal generated by amplifier 3 is supplied to DSP 4 having an external memory (not shown). DSP 4 generates digitized bit stream data by performing digital signal processing such as error correction and demodulation upon the amplified signal supplied by amplifiers. The digitized bit stream data is supplied from DSP 4 into MPEG decoder 8.

MPEG decoder 8 expands the digitized input bit stream data when compressed. MPEG decoder 8 also separates the digitized input bit stream into an audio signal and a video signal. The audio signal is converted from the digital signal into an analog signal via D/A converter 5 and then provided as an audio input to a speaker (not shown). The video signal is converted into an analog signal via D/A converter 5, and then provided as an image signal to screen 9 via a RGB TV encoder (not shown; may be included into the MPEG decoder).

If the input bit stream is not a compressed signal (e.g., CD/DA), the expanding step is skipped and the non-compressed input bit stream may be provided to audio signal D/A converter 5.

Control unit 7 controls DSP 4, MPEG decoder 8 and servo 6 based on inputs received from key input unit 14 or external remote controller 15 for performing the above-described series of operations. Additionally, control unit 7 reads out the information required for diverse controls, such as play list information, select list information, tract information, system control information and information required for the on-screen displays from DSP 4 and MPEG decoder 8. Control unit 7 stores this information in the memory, and generates a control command to OSD generator 10 for generating a required caption signal in accordance with the playing state of the player. OSD generator 10 then generates an alphanumeric signal in accordance with the control command received from control unit 7. The alpha numeric signal is mixed with the image signal supplied from MPEG decoder 8 to form the resultant signal used to generate a display on screen 9.

The preferred embodiment of the present invention will now be described in more detail with reference to the accompanying drawings.

Figure 4:
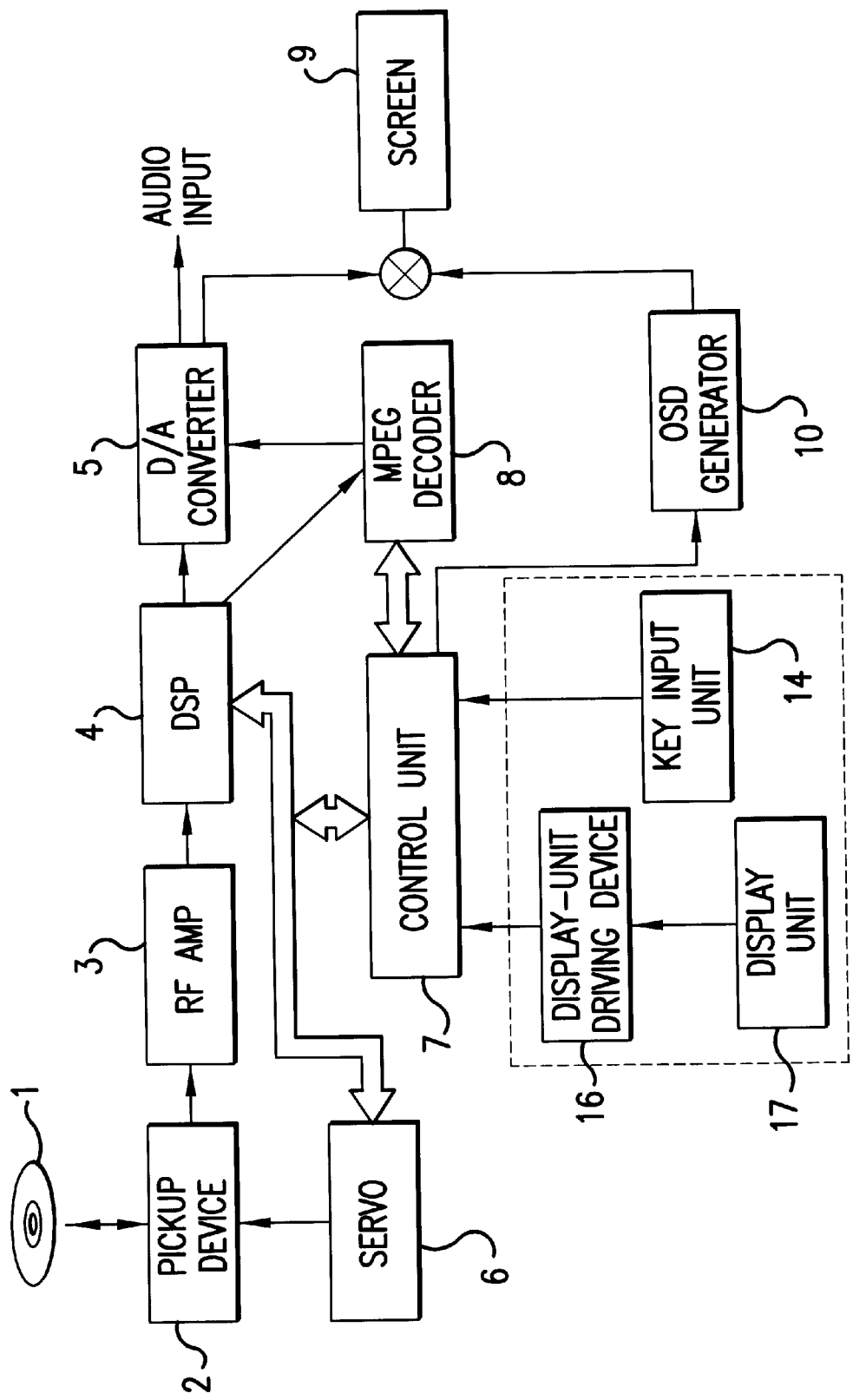
FIG. 4 is a block diagram showing an optical disc reproducing system according to the present invention.

FIG. 4 is a block diagram showing an optical disc reproducing system according to the present invention.

As shown in FIG. 4, the player according to the present invention is similar to the optical disc reproducing system shown in FIG. 1. However, the player of FIG. 4 includes a display-unit driving device 16 and a display unit 17. For this reason, only deviations from operation of the system of FIG. 1 will be described.

In this embodiment, display-unit driving device 16 controls display unit 17 in accordance with the control signal of control unit 7. This control can be achieved at a predetermined portion of the playback operation or when the signal supplied from key input unit 14 is supplied into control unit 7.

Key input unit 14 is connected to control unit 7 and provides control unit 7 with a signal corresponding to a user selected key.

Control unit 7 determines whether the user selected key enabled based on the signal and the existence of a corresponding offset value stored in the predetermined information area of the memory (not shown). If the user selected key is enabled, a control signal is provided to servo 6 in accordance with the selectable key. Servo 6 controls pickup device 2 by moving the pickup device 2 to the sector of the corresponding key value, thereby reading out data. If the user selected key is disabled, all enabled selectable keys under the currently-current state are searched. Then, enable/disable interrupt information is provided to display-unit driving device 16 with respect to all key input units.

Display-unit driving device 16 activates the display driving. For instance, if display unit 17 includes a plurality of LEDs, the driving device 16 performs on/off control.

Display unit 17 may include any type of display device, such as an array of LEDs or a single liquid crystal display panel. When display unit 17 includes LEDs, they are preferably incorporated into the boy of the key input unit.

Figure 5:
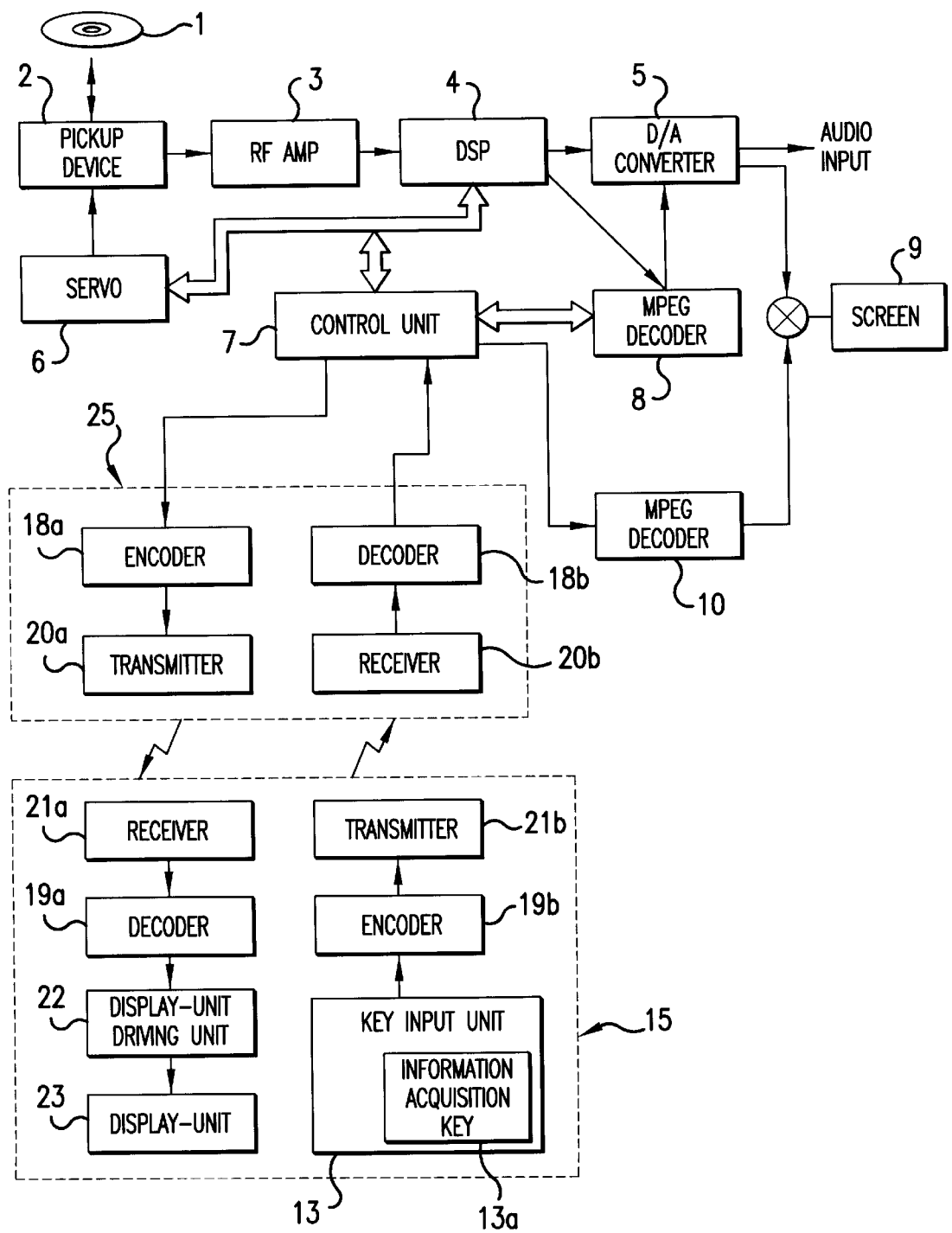
FIG. 5 is a block diagram showing the optical disc reproducing system additionally equipped with a remote controller according to the present invention.

FIG. 5 is a block diagram showing the optical disc reproducing system that includes a remote controller according to the present invention. Key input unit 14, display unit 17 and display-unit driving device 16 are omitted from FIG. 5.

In the general optical disc reproducing system shown in FIG. 1, remote controller 15 is furnished with key input unit 13 and transmitter 12 for transmitting a signal based on the input from key input unit 13, and the player is furnished with receiver 11 for receiving the transmission signal and providing that signal to control unit 7. To enable mutual communication between the player and remote controller, the preferred embodiment shown in FIG. 5, is equipped with transmitters/receivers 20a & 20b and 21a & 21b, encoders 18b and 19b for encoding prior to the transmission/reception, and decoders 18a and 19a for decoding the received signal. In this preferred embodiment, only remote controller 15 is equipped with a display-unit driving device 22 and a display unit 23. However, additional or alternative display-unit drive devices and display units may be provided.

Key input unit 13 of remote controller 15, which allows a user to select the menu, is connected to encoder 19b. Key input unit 13 provides a user selected key value to encoder 19b which encodes the input signal and provides that signal to transmitter 21b. Transmitter 21b sends the signal to receiver 20b of the player. The received signal is supplied from receiver 20b to decoder 18b where it is decoded. The decoded signal is supplied from decoder 18b into control unit 7. Control unit 7 reads out the offset information stored in the memory and compares that offset information with the decoded signal received from decoder 18b. Based on this comparison, control unit 7 determines whether the decoded signal corresponds to an enabled selectable key or not. The encoding and decoding systems preferably adopt the PCM system.

When the control unit 7 determines that the decoded signal corresponds to an enabled selectable key, control unit 7 provides a control signal to execute the corresponding to the input selectable key in the manner described with reference to FIG. 1. That is, the operation corresponding to the user selected key is carried out. Therefore, the detailed description relating to this operation is not described again here.

By contrast, if the control unit 7 determines that the decoded signal does not represent an enabled selectable key or that the decoded signal represents a disabled selectable key, control unit 7 searches for the enabled selectable keys based on the offset information stored in of the memory, and provides an appropriate control signal to display-unit driving device 22 based on the enabled selectable keys. Display-unit driving device 22 then controls display unit 23 to display all enabled selectable keys under the current state in accordance with the control signal supplied thereto.

Therefore, when control unit 7 determines that the decoded signal does not corresponds to an enabled selectable key, the control signal is provided to display-unit driving device 22 with respect to the enabled key. Alternatively, a separate information acquisition key (not shown) may be used to request identification of enabled selectable keys under the correct state. More specifically, an information acquisition key may be selected by a user to provide a signal with respect to the enabled selectable keys, which signal is supplied to display-unit driving device 22. Such an information acquisition key may be used for identifying the enabled selectable keys when a new menu is to be selected during reproducing disc 1.

Control unit 7 has external memory (not shown) for storing the system control data. A separate memory may be further provided for selectively displaying only the enabled selectable keys when displaying the entire key arrangement on the screen according to the present invention.

Hereinafter, in the optical disc reproducing system according to the present invention, FIGS. 6 to 9 will be used to describe methods for controlling generation of a visual display on the display unit when the interrupt input is supplied from input unit 14 and/or remote-controller key input unit 13 during the play operation.

A method for visually discriminating the enabled keys on the player front during the play operation will be described first.

Figure 6:
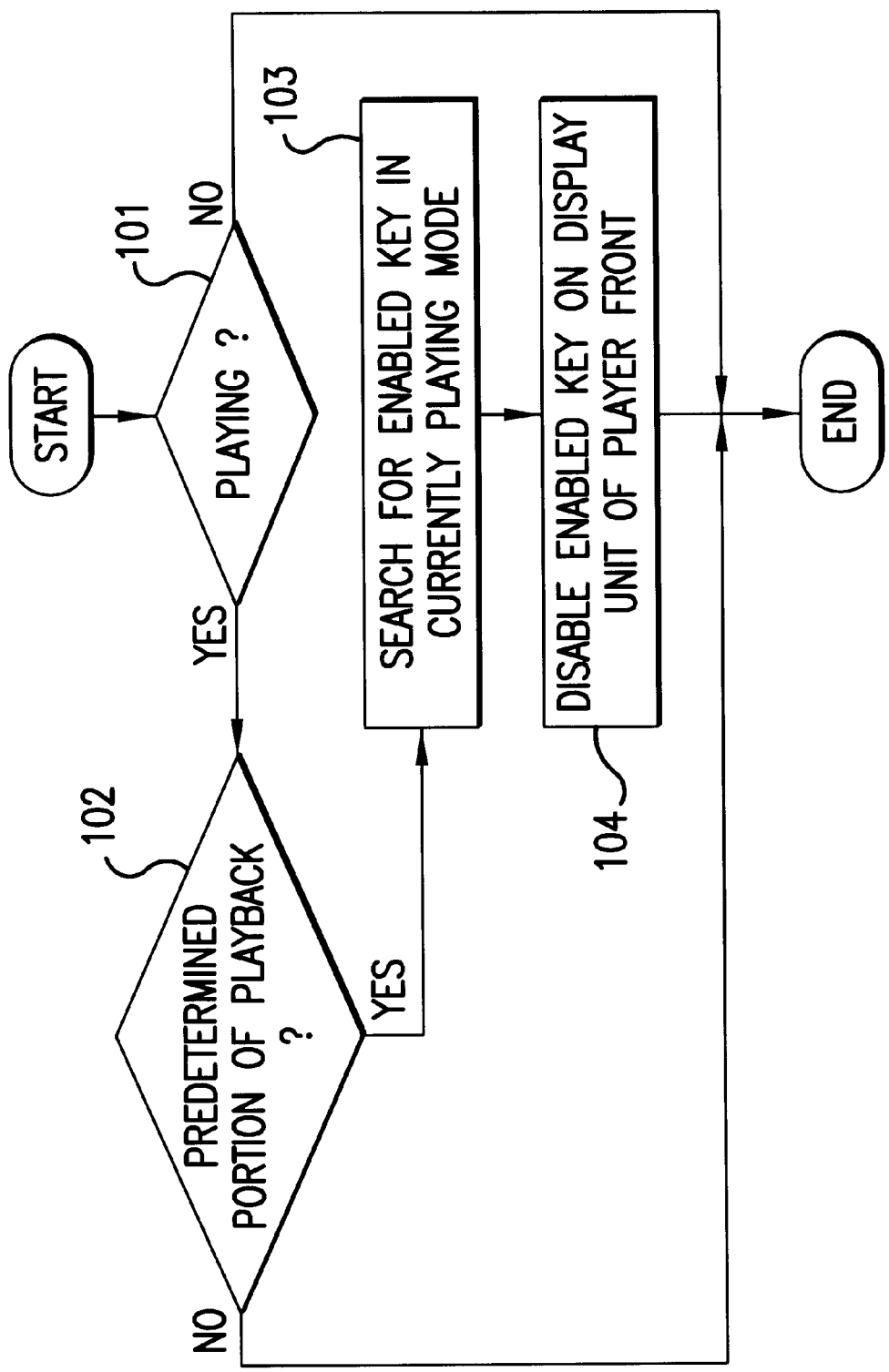
FIG. 6 is a flowchart illustrating a method for identifying enabled selectable keys during the play operation in the optical disc reproducing system according to the present invention.

FIG. 6 is a flowchart illustrating a method for visually distinguishing the enabled/disabled keys on the player front in the optical disc reproducing system according to the present invention, regardless of input received from the user. The keys may be distinguished throughout the playback process, or only during select predetermined portions of the playback process. FIG. 6 includes step 102 to describe distinguishing the keys during predetermined portions of the playback operation. However, that step could be eliminated to achieve constant identification of the respective keys.

In step 101 of FIG. 6, control unit 7 determines whether optical disc 1 is being played or not. The process proceeds to step 102 when optical disc 1 is being played and terminates if it is not being played. In step 102, control unit 7 determines whether the playback operation has reached a predetermined portion of the playback operation requiring identification of the enabled selectable keys. If such a predetermined portion of the playback operation is reached, the precess proceeds to step 103. In step 103, control unit 7 reads out the offset information stored in its memory, searches to determine which selectable keys are enabled in the currently-played mode, and provides the control signal to display-unit driving device 16 based on that determination. In step 104, the enabled selectable keys are displayed or otherwise distinguished. For instance, display-unit driving device 16 may display or distinguish the selectable keys which are enabled onto display unit 17 on the player front.

Figure 7:
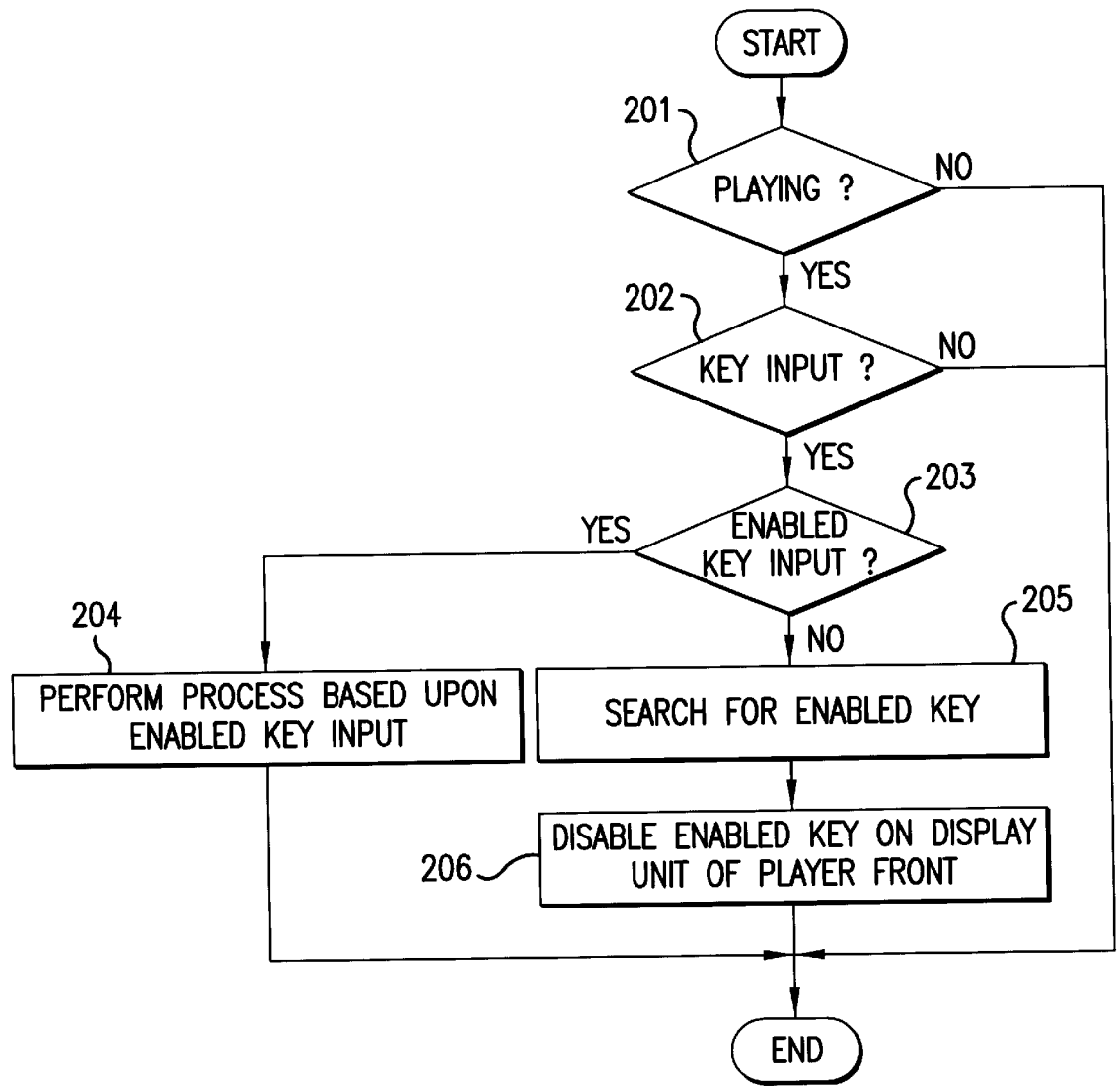
FIG. 7 is a flowchart illustrating a process of identifying enabled selectable keys when a user's interrupt input exists.

FIG. 7 is a flowchart illustrating control of a visual display based on the selectable keys in response to a user's interrupt via, e.g., input unit 14 in the optical disc reproducing system, according to the present invention.

Control unit 7 determines whether optical disc I is currently being played or not in step 201. If it is not being played, the process is terminated. If optical disc 1 is being currently played, the process proceeds to step 202.

In step 202, control unit 7 determines whether a user input is received. When no user input is received the process ends. If an input is supplied by key input unit 14, the process proceeds to step 203.

In step 203, control unit 7 determines whether the input key is an enabled selectable key based on the offset information stored in the memory. If the input key is an enabled selectable key, the process proceeds to step 204 to perform processing based on the input key i.e., an operation such as playback, after which processing the program is terminated. If the input key is a disabled selectable key, the process proceeds to step 205.

In step 205, control unit 7 searches for enabled selectable keys using the offset information stored in the memory, and provides a signal based on the enabled/disabled keys to display-unit driving device 16.

In step 206, the enabled keys are displayed on display unit 17 of the player front under the control of display-unit driving device 16, or otherwise distinguished from the non-enabled selectable keys.

Figure 8:
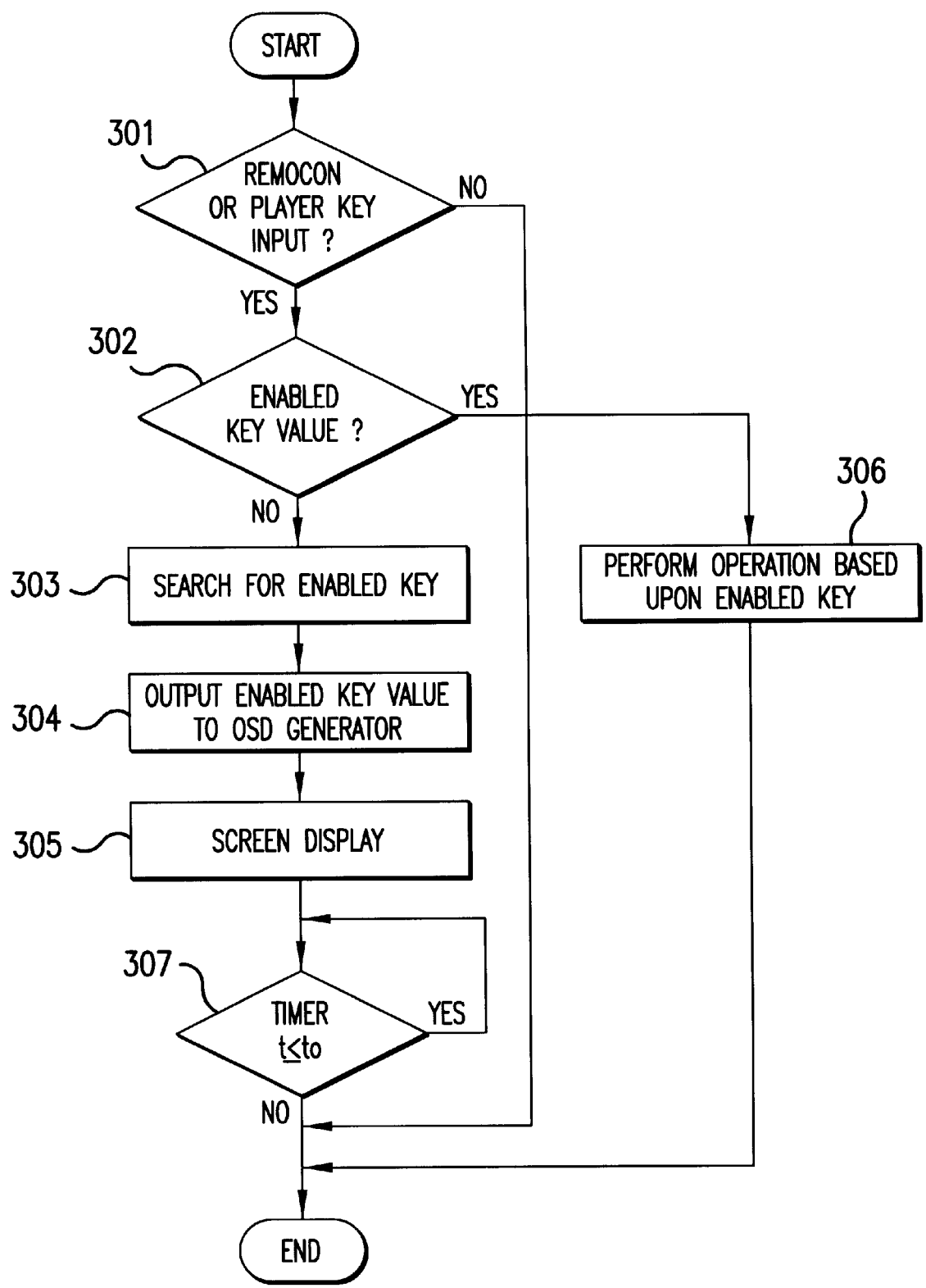
FIG. 8 is a flowchart illustrating a process of identifying enabled selectable keys via an OSD processing, including display of the key board on the screen in the optical disc reproducing system according to the present invention.

FIG. 8 is a flowchart illustrating a method for visually distinguishing between enabled/disabled selectable keys on the on-screen display (OSD) in response to a user interrupt in the optical disc reproducing system according to the present invention.

In step 301, control unit 7 determines whether an input is generated by key input unit 14 of the player, or information acquisition key or key input unit 13 of remote controller 15. If there is a key input, the process proceeds to step 302, otherwise, it is terminated.

In step 302, control unit 7 reads the offset information corresponding to the input key from the memory to decide whether the input key corresponds to an enabled key or not. If the input key is an enabled key, the process proceeds to step 306. In step 306, control unit 7 provides a control signal to servo 6 for performing an operation based on the enabled key in accordance with the system control information stored in the memory, and servo 6 controls pickup device 2 to read out and play the selected data.

If it is determined in step 302 that the input key corresponds to a disabled key the process proceeds to step 303. In step 303, control unit 7 searches the memory for enabled selection keys based on the offset information stored in the memory.

In step 304, a control signal corresponding to the enabled selectable keys is provided to OSD generator 10.

In step 305, OSD generator 10 displays a caption onto the screen with respect to the enabled selectable keys.

As indicated by FIG. 8, the preferred embodiment of the present invention may further includes a step 307 of freezing the display on screen 9 for a predetermined time t0 after step 305.

Figure 9:
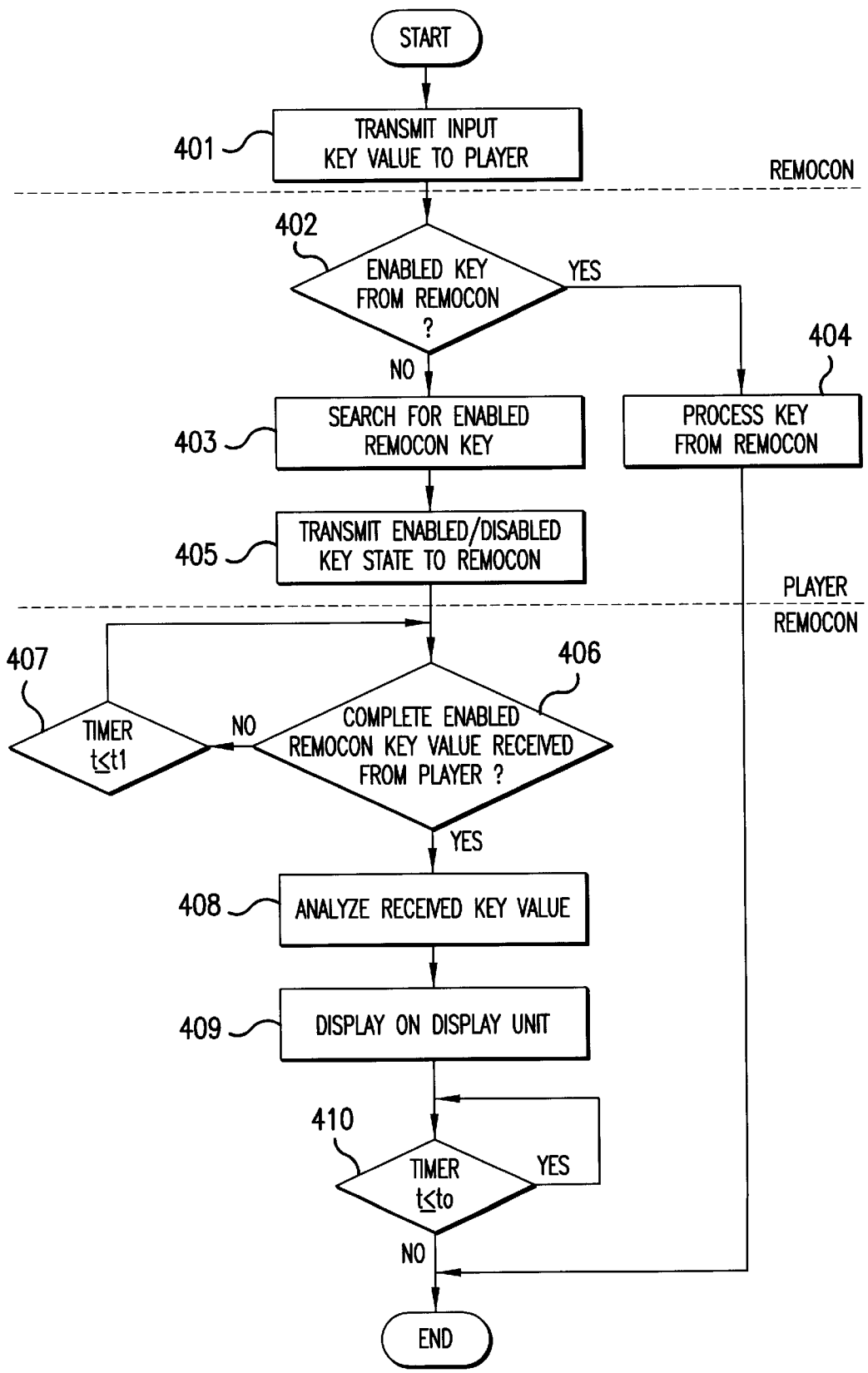
FIG. 9 is a flowchart illustrating the method for identifying enabled selectable keys on the remote controller when the user's interrupt input exists.

FIG. 9 is a flowchart describing a controlling method for visually distinguishing between the enabled/disabled selectable keys on display unit 23 of the remote controller when the user's interrupt input is supplied from the remote controller.

In step 401, the remote controller transmits the signal with respect to the input key value to receiver 20b of the player. The transmitted signal is received by the player, is decoded in decoder 18b of the player by a PCM system, and is provided to control unit 7.

In step 402, control unit 7 decides whether the received signal represents an enabled key or not by comparing it with the offset information stored in the memory. When the received signal has a signal value corresponding to an enabled key, the process proceeds to step 404. In step 404, control unit 7 provides the control signal with respect to the enabled key to servo 6, and servo 6 controls pickup device 2 to play the data with respect to the selected key value from optical disc 1.

When the received signal is determined in step 402 does not to correspond to an enabled selectable key, the process proceeds to step 403. In step 403, control unit 7 searches to identify the enabled selectable keys under the current state based on the offset information stored in memory.

In step 405, a signal generated by control unit 7 with respect to the enabled/disabled key is encoded in encoder 18a by the PCM system, and the encoded signal is transmitted to the remote controller via transmitter 20a.

In step 406, receiver 21a of the remote controller receives the signal transmitted from the remote controller, and determines whether that signal has been thoroughly received from the player or not. The process is delayed in step 407 for a predetermined time t1 by a timer until the signal is thoroughly received, after which program flow is returned to step 406. Once the entire signal has been received, the signal is decoded in decoder 19a and the program proceeds to step 408.

In step 408, display-unit driving device 22 analyzes the decoded key value, generates a signal with respect to the enabled selectable keys of the current state, and supplies that signal to display unit 23.

In step 409, the enabled selectable keys are displayed on display unit 23, or otherwise distinguished from the non-enabled selectable keys.

In step 410, the timer of display-unit driving device 22 causes display unit 23 to display the enabled selectable keys for predetermined time t0 and to stop the display operation when the predetermined time has elapsed.

In the present invention as described above, the enabled selectable keys may be discriminatively displayed on display unit 23 of the remote controller in response to a key input representing a selectable key of an input device such as the key input unit 13 of the remote controller, or a key input representing a information acquisition key. In addition, the key input may be simultaneously displayed on the screen and display unit 17 on the player front. For example, when the key input is executed using key input unit 13 or the remote controller, the enabled selectable keys may be distinguished from the non-enabled selectable keys. The enabled selectable keys may be distinguished by display of these keys on only display unit 17 of the player front, on screen 9 together with display unit 17 of the player front, or on display unit 23 of the remote controller. While the enabled selectable keys are displayed on display unit 17 of the player front, it is also possible to simultaneously display the keys on screen 9 and display unit 23 of the remote controller, or to otherwise identify those keys in any other manner.

Like FIGS. 7–9, FIGS. 10–12 show methods for controlling the generation of the visual display on the display unit when an interrupt input is supplied from input unit 14 and/or remote-controller key input unit 13 during the playback and operation. However, unlike the processes shown in FIGS. 7–9, which display the enabled selectable keys in response to user input of a non-enabled selectable key, the processes of FIGS. 10–12 involve displaying the enabled selectable keys in response to user input of an information acquisition key representing a user request for identification of the enabled selectable keys.

Figure 10:
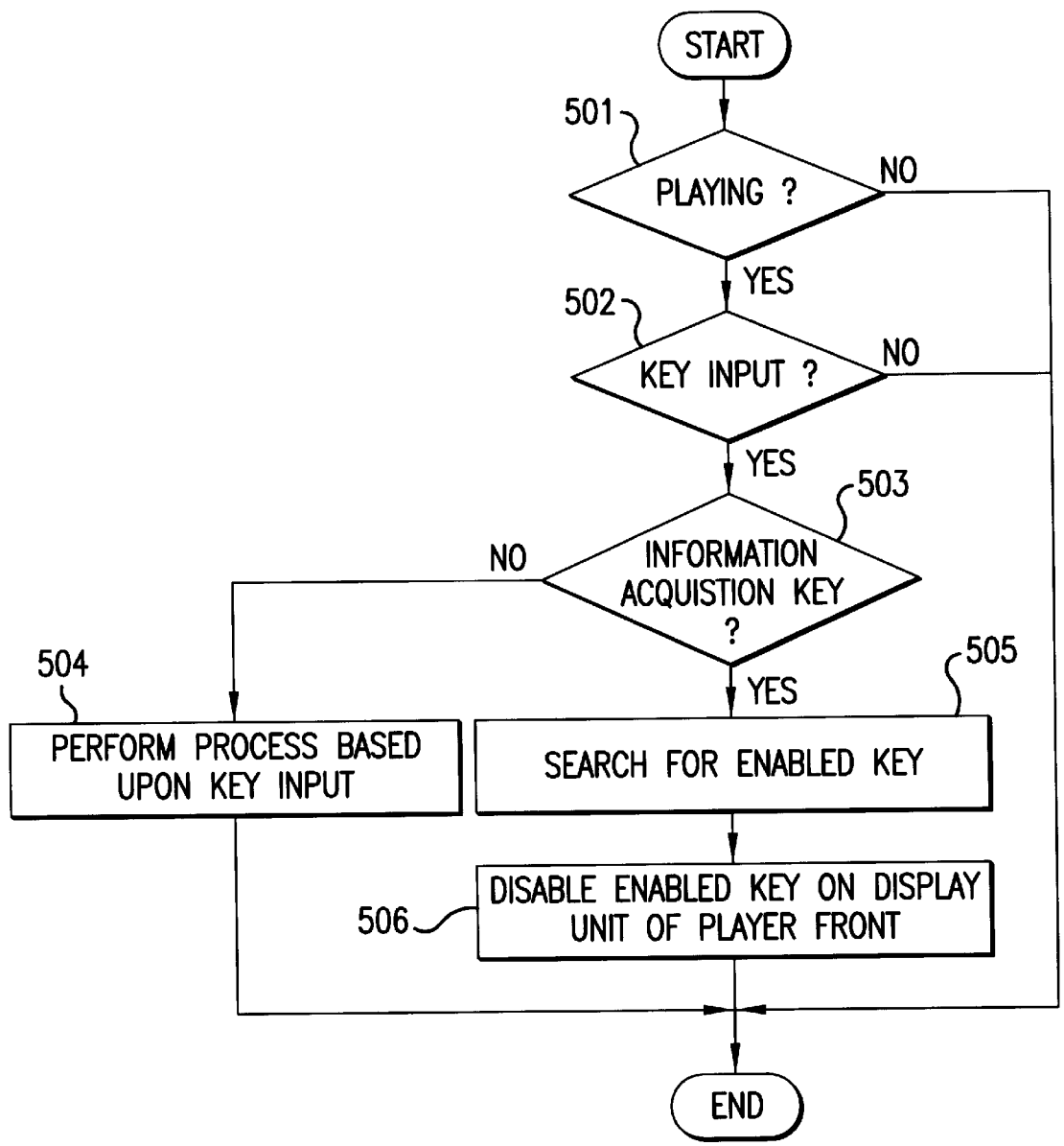
FIG. 10 is a flowchart illustrating a process of identifying enabled selectable keys in response to a user input representing an information acquisition key.

FIG. 10 is a flowchart illustrating control of a visual display based on user input of an information acquisition key.

In step 501, control unit 7 determines whether optical disc 1 is currently 10 being played or not. The process is terminated when the disc is not being played; otherwise, the process proceeds to step 502. In step 502, control unit 7 determines whether a user input is received. The process is terminated in the absence of user input; the process continues to step 503 if an input is received. In step 503, control unit 7 determines whether the user input corresponds to an information acquisition key. If the user input does not correspond to an information acquisition key, the process continues to step 504 where processing is performed based on the user input. However, if the user input corresponds to an information acquisition key, the process proceeds to step 505. In step 505, control unit 7 searches for enabled selectable keys using the offset information stored in the memory, and provides a signal based on the enabled selectable keys to display-unit driving device 16. In step 506, the enabled selectable keys are displayed on display unit 17 under the control of display-unit driving device 16, or otherwise distinguished from the non-enabled selectable keys.

Figure 11:
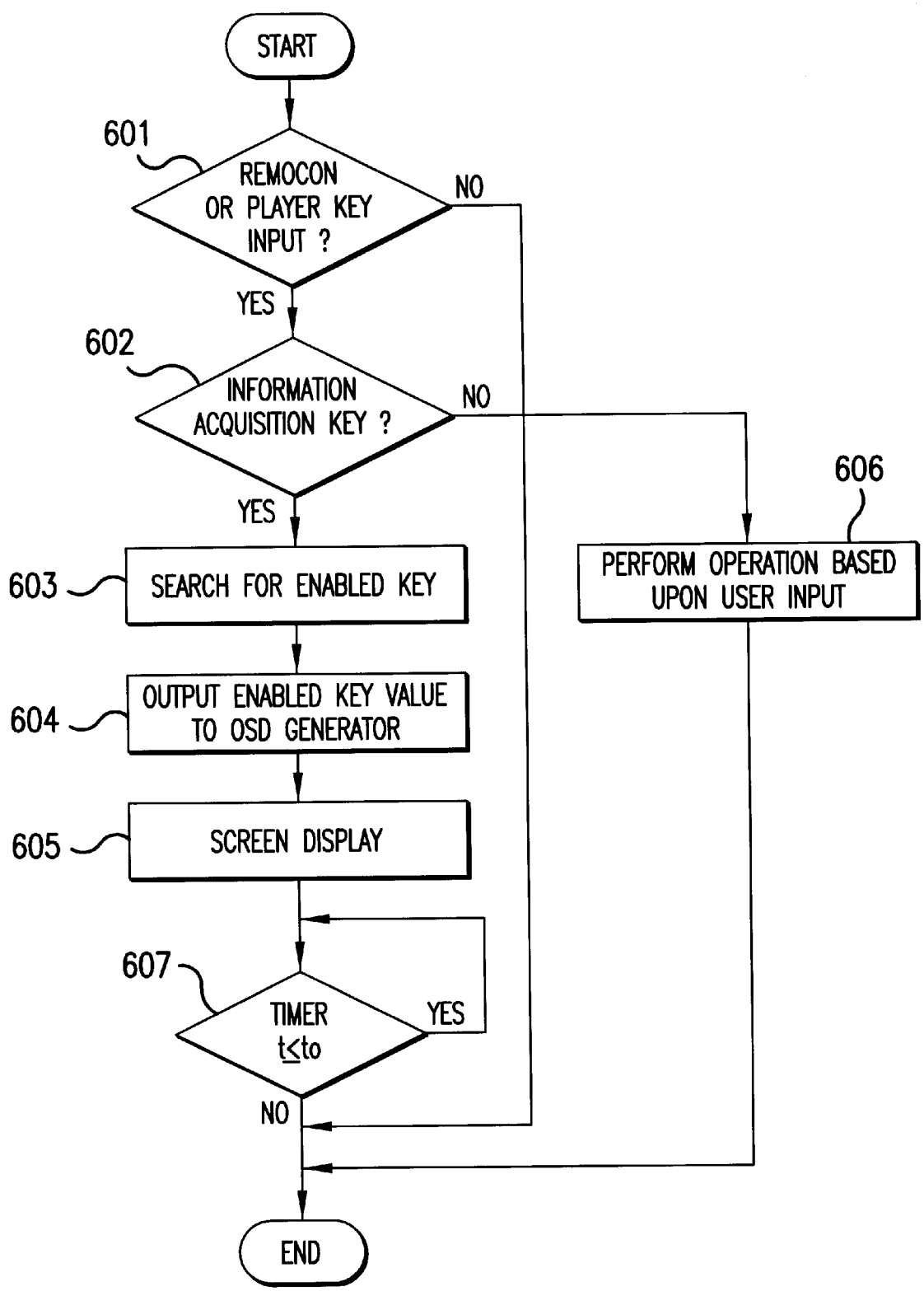
FIG. 11 is a flowchart illustrating a process of identifying enabled selectable keys via OSD processing in response to a user input representing an information acquisition key.

FIG. 11 is a flowchart illustrating a method for visually distinguishing between enabled and disabled selectable keys on an on-screen display (OSD) in response to a user interrupt corresponding to an information acquisition key. In step 601, control unit 7 determines whether a user interrupt is received from a remote controller or key input unit. The process is terminated in the absence of a user input. The process continues to step 602 when a user input has been received. In step 602, control unit 7 determines whether the user input corresponds to an information acquisition key. If the user input does not correspond to an information acquisition key, processing is performed based on the user input in step 606. However, if the user input corresponds to an information acquisition key in step 602, the process proceeds to step 603 where control unit 7 searches the memory for enabled selectable keys based on the offset information stored in the memory. Steps 604–607 are similar to steps 304–307 of FIG. 8 described previously.

Figure 12:
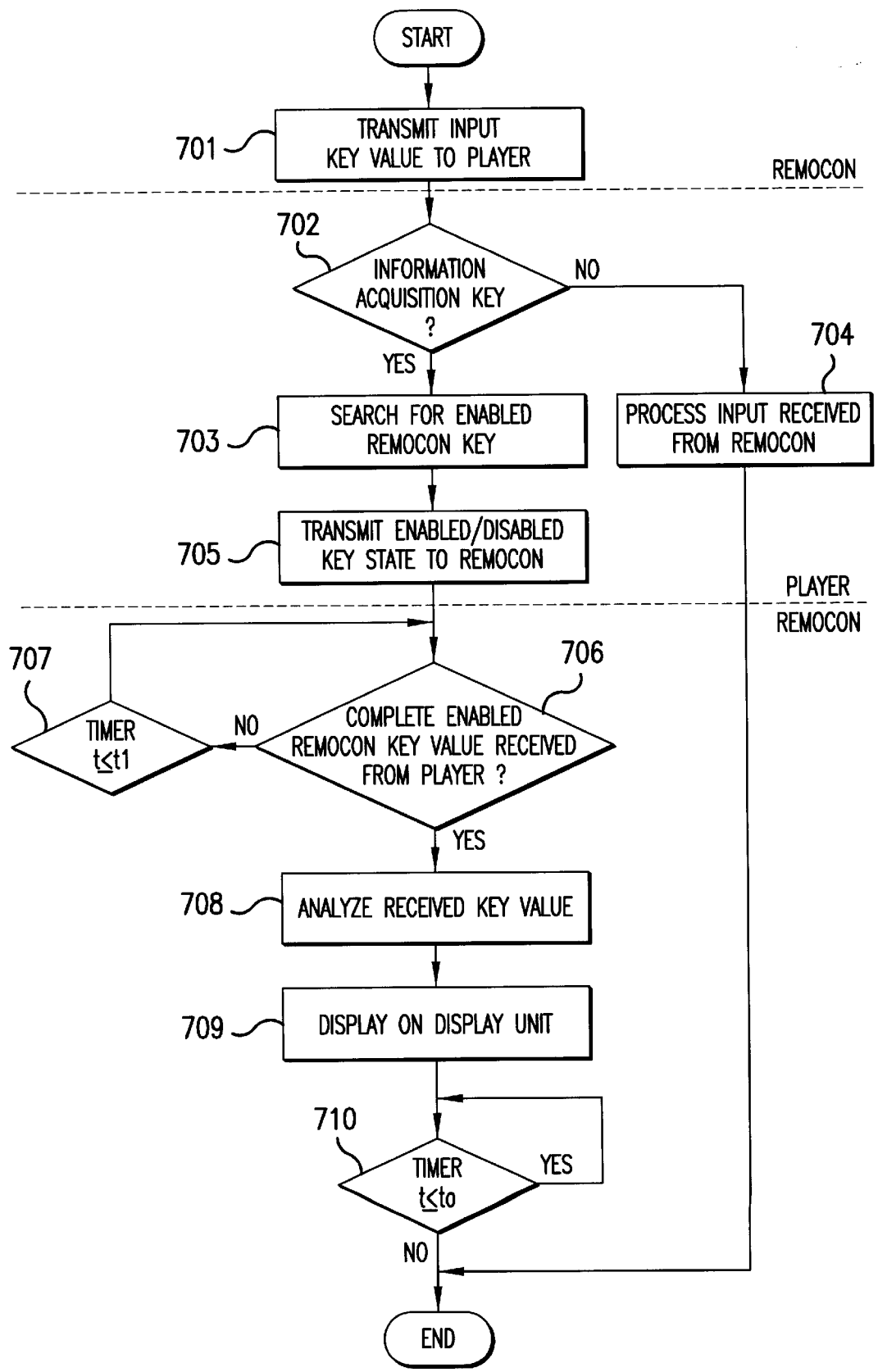
FIG. 12 is a flowchart illustrating a process for identifying enabled selectable keys on a remote controller in response to a user input representing an information acquisition key.

FIG. 12 is a flowchart describing a control method for visually distinguishing between enabled and disabled selectable keys on display unit 23 of the remote controller in response to a user input corresponding to an information acquisition key.

In step 701, a signal corresponding to a user input is transmitted from the remote controller to receiver 20*b* of the player. The transmitted signal is received by the player, is decoded in decoder 18*b* of the player by a PCM system, and is provided to control unit 7. In step 402, control unit 7 determines whether the received signal corresponds to an information acquisition key or not. When the received signal does not correspond to an input of an information acquisition key, the process proceeds to step 404 where the input received from the remote controller is processed. However, when control unit 7 determines that the signal received from the remote controller corresponds to an information acquisition key, the process proceeds to step 703. Steps 703–710 correspond to steps 403–410 of FIG. 9 described previously.

Moreover, FIGS. 6–12 demonstrate distinguishing enabled selectable keys from non-enabled selectable keys in at least three circumstances: when a predetermined portion of a playback operation is reached, when a user input corresponding to a non-enabled selectable key is received, and when a user input corresponding to an information acquisition key is received. FIGS. 6–12 also demonstrate distinguishing between enabled and non-enabled selectable keys in a variety of ways including: displaying enabled keys on a display unit of a player front, displaying enabled keys on an on-screen display (OSD) of the playback unit, and displaying the enabled keys on a remote controller used to control the playback unit. Each of these processes can be employed independently or in combination.

Figure 13A:
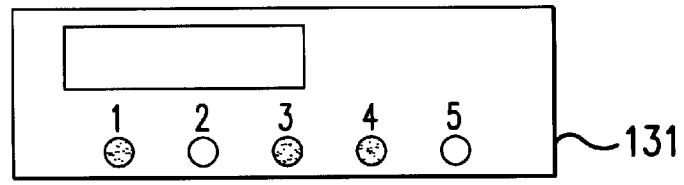
FIGS. 13A–13C illustrates various techniques for visually distinguishing enabled selectable keys from non-enabled selectable keys.
Figure 13B:
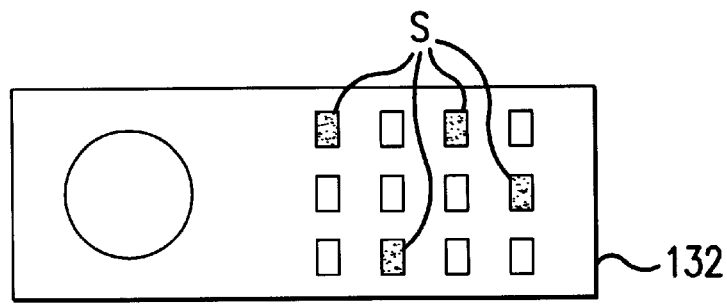
Figure 13C:
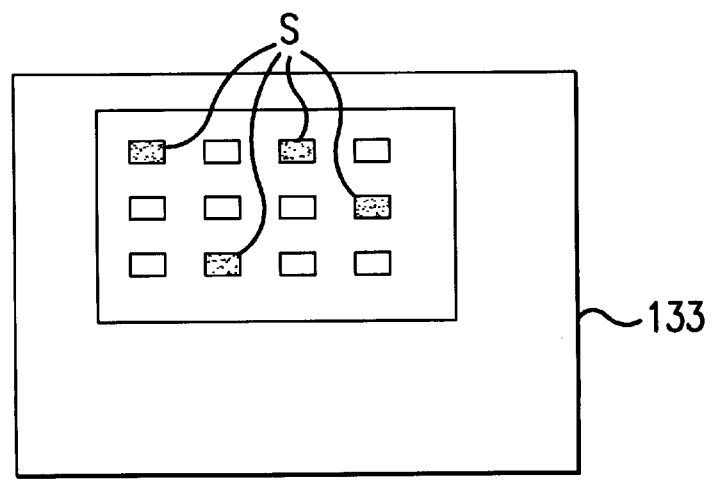

FIGS. 13A–13C demonstrate the three methods for visually discriminating between enabled and non-enabled selectable keys mentioned above. In each figure, shaded keys correspond to enabled selectable keys. In FIG. 13A, enabled controls 1, 3 and 4 are visually distinguished from non-enabled controls 2 and 5 on a front panel of player 131. In FIG. 13B, enabled selectable controls S are visually distinguished from non-enabled selectable controls on a control panel of remote controller 132. In FIG. 13C, enabled selectable controls S are visually distinguished from non-enabled selectable controls on a display screen such as an on-screen display (OSD). Display 133 can be located on player 131, remote controller 132, or some other display device. When located on the display device used to perform playback operations, the background for display 133 may be the program being reproduced, a frozen image from the program being reproduced, or some other background such as a blue screen. Other techniques may also be used to distinguish between the enabled selectable keys and the non-enabled selectable keys. For instance, keys may be distinguished auditorially or mechanically. Also, as shown in FIG. 13C, display 133 may show a keyboard arrangement that visually discriminates among the enabled selectable keys and the non-enabled selectable keys.

According to the present invention, the information data stored in the predetermined area of the optical disc is utilized to check the currently enabled keys, and to visually discriminate among respective keys of the key input unit on the display unit. The present invention is therefor able to lead a user to recognize the selectable keys under respective states when receiving an interrupt input. Furthermore, the present invention has the effect of visually discriminating respective keys of the key input unit on the display unit during playback from the optical disc to allow the user to visually recognize the selectable keys under respective states.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for identifying at least one enabled selectable key, comprising:

an interface unit to receive user input indicating a selected key; and a control unit to determine if said input corresponds to an enabled selection and visually discriminating said enabled selectable keys from non-enabled selectable keys when said determining step determines said selected key is not an enabled selectable key.

2. The apparatus of claim 1, wherein, in performing said determining, said controller reads an offset information from a disc and identifies said at least one enabled selectable key based on said offset information.

3. The apparatus of claim 2, wherein said offset information includes an offset address.

4. The apparatus of claim 2, wherein said offset information includes an offset flag.

5. An apparatus for identifying at least one enabled selectable key, comprising:

an interface unit to receive an input;

a control unit to determine if an input corresponds to a request for identification of said at least one enabled selectable key and to identify said at least one enabled selectable key in response to said request for identification; and a selection display unit to visually discriminate said at least one enabled key from a non-enabled selectable key under control of said control unit, which controls said selection display unit based on said identification and in response to said request for identification.

6. The apparatus of claim 5, wherein, in performing said identification, said controller reads an offset information from a disc and identifies said at least one enabled selectable key based on said offset information.

7. The apparatus of claim 6, wherein said offset information includes an offset address.

8. The apparatus of claim 6, wherein said offset information includes an offset flag.

9. A method to identify at least one enabled selectable key, comprising:

determining if an input corresponds to a request for identification of said at least one enabled selectable key;

identifying said at least one enabled selectable key in response to said request for identification of said at least one enabled selectable key; and visually discriminating said at least one enabled key from a non-enabled selectable key based on said identification and in response to said request for identification.

10. The method of claim 9, wherein said identifying step comprises:

reading an offset information from a disc; and identifying said at least one enabled selectable key based on said offset information.

11. The method of claim 10, wherein said offset information includes an offset address.

12. The method of claim 10, wherein said offset information includes an offset flag.

13. A method to identify at least one enabled selectable key, comprising:

receiving user in put indicating a selected key;

determining if said selected key is an enabled selectable key; and visually discriminating said enabled selectable keys from non-enabled selectable keys when said determining step determines said selected key is not an enabled selectable key.

14. The method of claim 13, wherein said determining step comprises:

reading an offset information from a disc; and identifying said enabled selectable keys based on said offset information.

15. The method of claim 14, wherein said offset information includes an offset address.

16. The method of claim 14, wherein said offset information includes an offset flag.

* * * * *